Aug. 12, 1947.  E. A. LEFEBRE  2,425,545
OUTLET BOX COUPLING
Filed Sept. 17, 1943  4 Sheets-Sheet 1
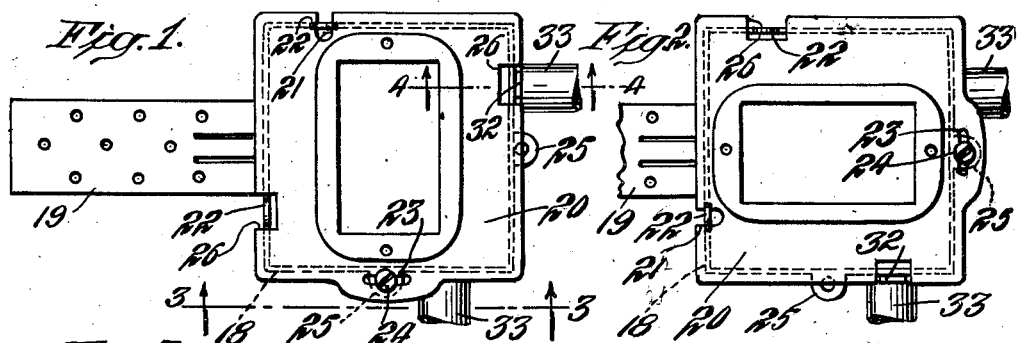
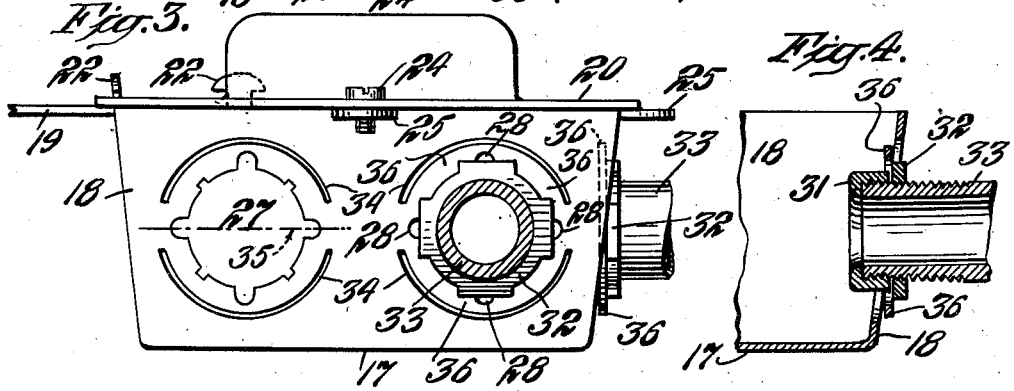
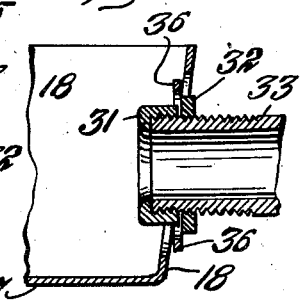
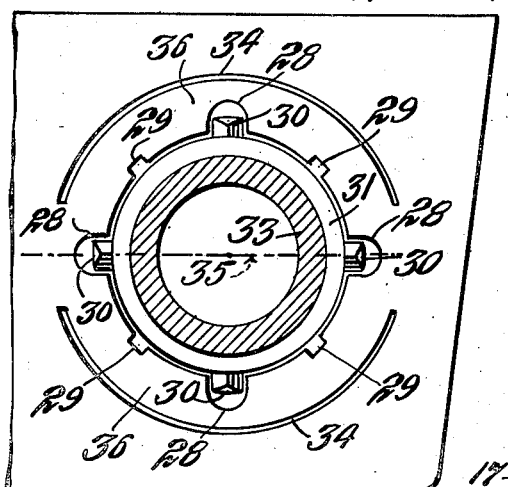
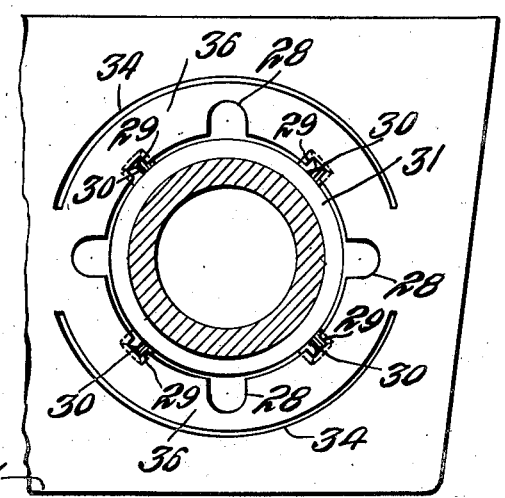
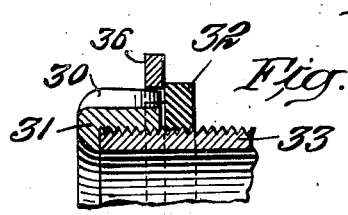
INVENTOR.
EDWARD A. LEFEBRE
BY
ATTORNEY Aug. 12, 1947.                E. A. LEFEBRE                2,425,545
                          OUTLET BOX COUPLING
                         Filed Sept. 17, 1943            4 Sheets-Sheet 2
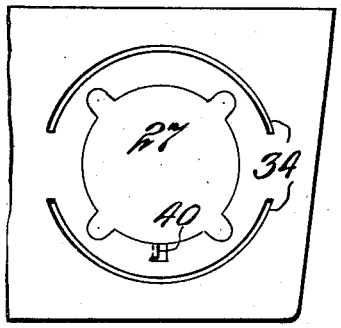
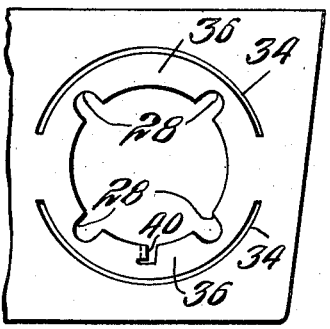
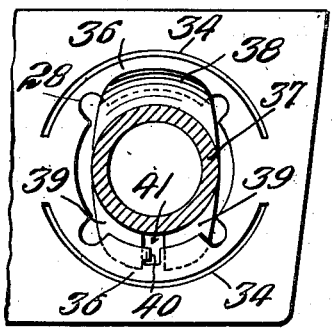
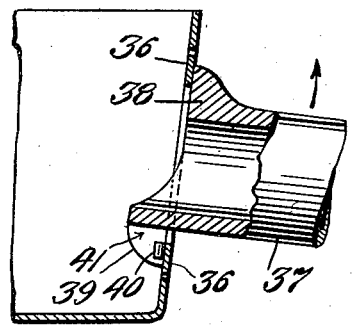
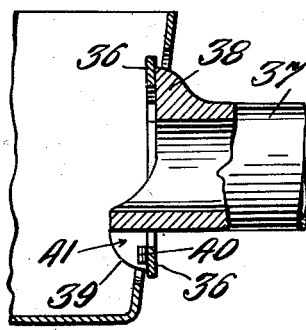
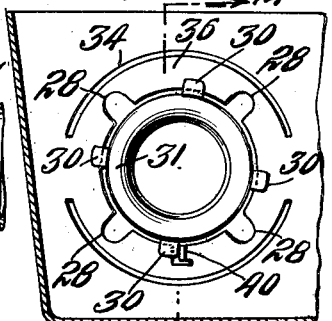
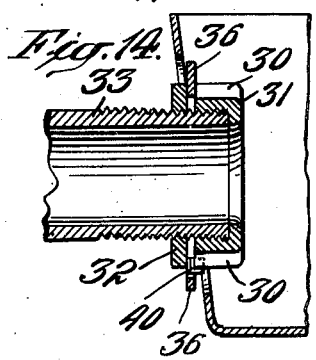
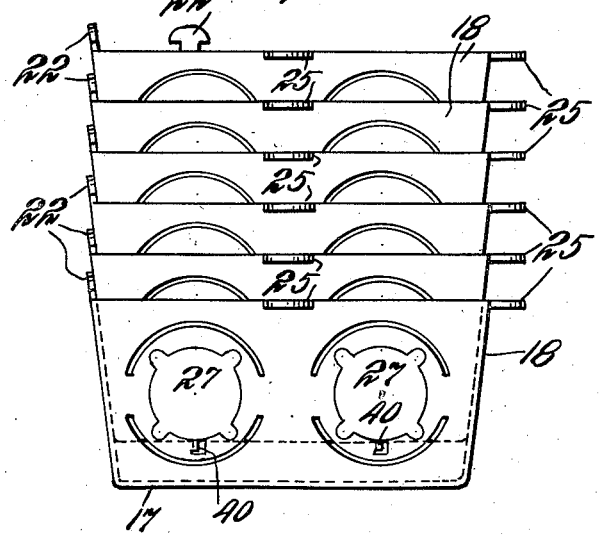
INVENTOR.
EDWARD A. LEFEBRE
BY
ATTORNEY

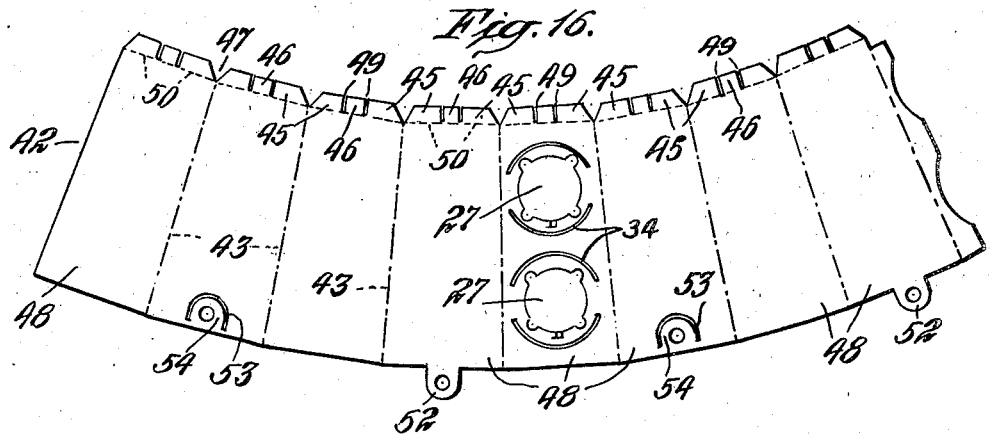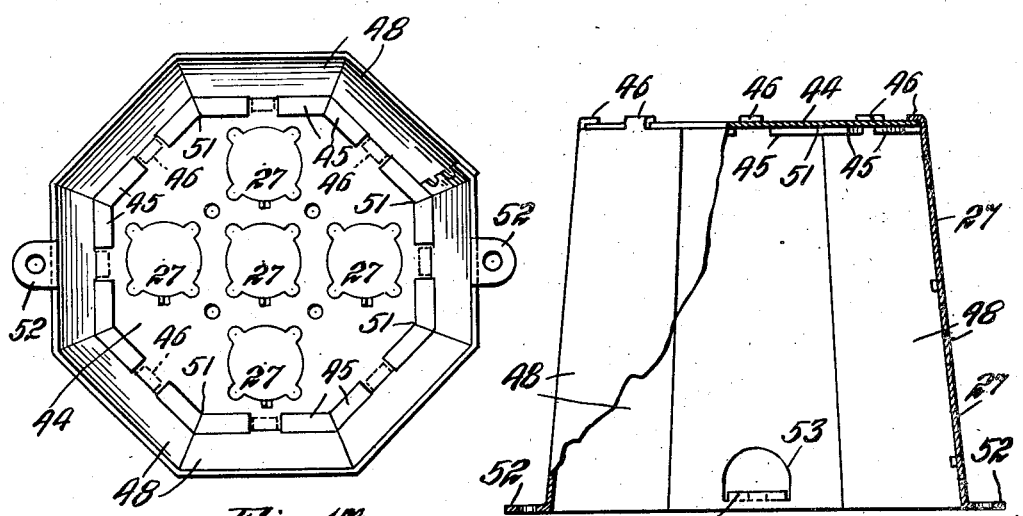

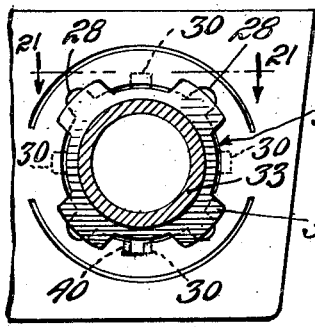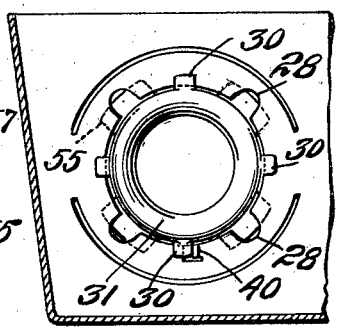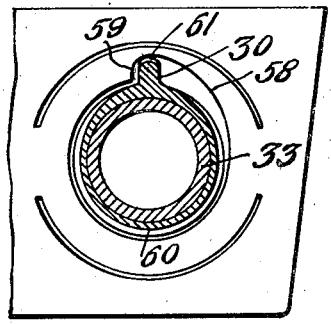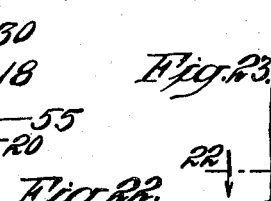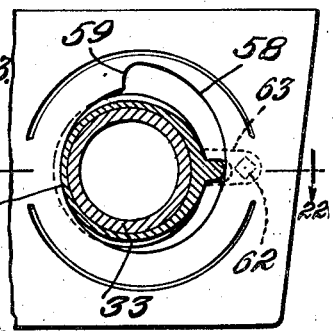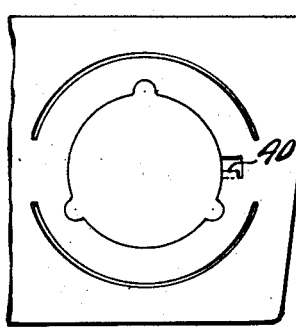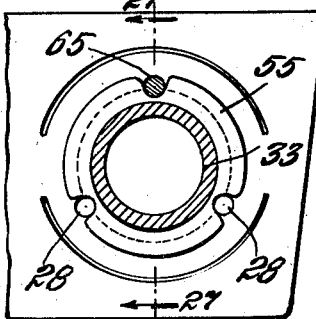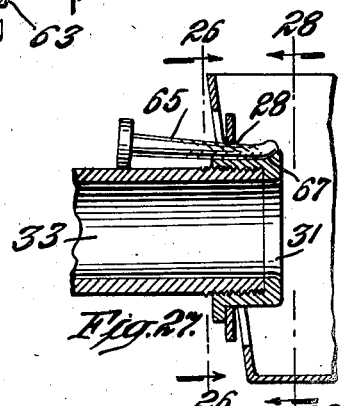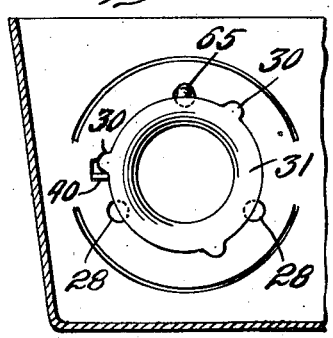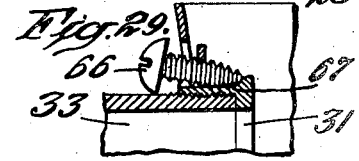

Patented Aug. 12, 1947

2,425,545

UNITED STATES PATENT OFFICE 2,425,545

OUTLET BOX COUPLING

Edward A. Lefebre, Jamaica, N. Y., assignor of forty-five per cent to Edward Henry Lefebre, Springfield Gardens, forty-five per cent to Stuart H. George, Bellerose, and ten per cent to Francis J. Orzel, Regent Park, N. Y.

Application September 17, 1943, Serial No. 502,850

8 Claims. (Cl. 285—6.5)

The invention herein disclosed relates to outlet boxes, switch boxes and the like.

Objects of the invention particularly are to provide a box for electric wiring purposes, of such construction that a plurality of the boxes can be packed in "nested" relation, and further, of such construction that the conduit, armored cable or the like, can be connected to the box either in inclined relation or so as to stand in the customary right angled relation to the back of the box.

In conjunction with the latter purpose, it is an object of the invention to provide a satisfactory knockout and bending tool for quickly converting the box to receive the conduit, cable or the like, and in the desired angular relation.

Another important object of the invention is to enable the connection of the conduit, armored cable or the like, wholly from the outside of the box; this particularly to avoid the inconvenience and annoyance of having to apply the bushings to the ends of the conduit, etc., at the inside of the box.

A further object is to enable the attachment of the box cover in either one of two different positions and the shifting of the same then to locate it, for example, lined up in a desired vertical or horizontal position.

Other desirable objects attained by the invention will appear in the course of the following specification.

The drawings accompanying and forming part of the specification illustrate certain present preferred embodiments of the invention. Structure, however, may be further modified and changed, all within the true intent and broad scope of the invention as hereinafter defined and claimed.

Figs. 1 and 2 are face views of a switch box incorporating features of the invention showing how the cover plate may be applied and adjusted in different positions.

Fig. 3 is an enlarged side view of the box, with one piece of attached conduit appearing in section as on the line 3—3 of Fig. 1.

Fig. 4 is a broken sectional detail, longitudinally of a section of attached conduit, as on line 4—4 of Fig. 1.

Figs. 5 and 6 are further enlarged broken side views of the box showing how the conduit with the end bushing attached is first inserted through larger notches in the knockout opening and then partly turned to interlock the lugs on the bushing with smaller notches in the knockout opening, the conduit appearing in section.

Fig. 7 is a broken sectional detail illustrating the bushing interlocked with the smaller notches, at the inside of the box and the lock nut tightened up at the outside.

Fig. 7a is a detached view of the bushing.

Figs. 8 and 9 are broken side elevations of a modified form of construction showing first the knockout in place, and secondly, the bushing receiving opening provided by removal of the knockout.

Fig. 10 is a similar view with the tool inserted for bending a surrounding portion of the box wall into desired angular relation, the handle portion of the tool appearing in section.

Figs. 11 and 12 are broken sectional details showing first the tool inserted and then rocked to effect the bending of the box wall.

Fig. 13 is a broken part sectional detail showing the bushing held non-rotatably by a stop lug on the inner face of the box wall.

Fig. 14 is a broken sectional detail on substantially the plane of line 14—14 of Fig. 13.

Fig. 15 is a side elevation showing a group of the boxes in nested relation.

Fig. 16 is a plan of a blank for producing the side wall of a concrete box embodying the invention.

Fig. 17 is a view looking inside the concrete box.

Fig. 18 is a broken part sectional side elevation of the concrete box.

Figs. 19, 20, 21, are broken part sectional views of a modified form of the end connection; Fig. 19 being an inside view of the box and attached end bushing; Fig. 20 being a cross-section at the outside of the box wall as on line 20—20 of Fig. 21 and Fig. 21 being a broken section as on line 21—21 of Fig. 20.

Figs. 22, 23, 24, are views of another modification; Fig. 22 being a horizontal sectional view as on line 22—22 of Fig. 23 and Figs. 23, 24, being cross-sectional views as on lines 23—23 and 24—24 of Fig. 22.

Figs. 25 to 29 are views illustrative of further modifications; Fig. 25 showing the form of knockout in the box wall; Fig. 26 being a cross-section as on line 26—26 Fig. 27; Fig. 27 being a broken longitudinal section as on line 27—27, Fig. 26; Fig. 28 showing the bushing as it appears at the inside of the box as on line 28—28 of Fig. 27 and Fig. 29 a view similar to Fig. 27 showing a screw in place of the nail form of fastening.

In Figs. 1, 2 and 3 the box is shown as constructed with a back wall 17 and integrally attached inclined side walls 18, flaring toward the front of the box structure.

This form of construction will nest in closely compacted relation, as shown in Fig. 15, taking up but small space for shipping, storage and handling and one box shell reinforcing the other so that a group of such boxes will require no special care in handling or packing.

These boxes may be mounted in the usual way or by means of a special bracket 19 hooked into the back and extending out over the edge of one side wall as covered in the prior Lefebre Patent No. 2,320,621 of June 1, 1943.

A switch box cover is indicated at 20, interchangeably and adjustably connected with the box by having a narrow slot 21 in one side edge adapted to hook under a headed upstanding lug 22 on either one of two angularly related side walls of the box and an arcuate slot 23 in the opposite side edge for a screw 24 to engage in a screw lug 25 projecting from one of the other two angularly related side walls of the box.

The other two side edges of the cover are shown formed with slots or notches 26, wider than the lug engaging notches 21 to pass freely over whichever one of the upstanding lugs 22 is not in use, such as the lug 22 at the left in Fig. 1, or the lug 22 which is at the top in Fig. 2.

To enable the entry and the securing of the conduit wholly from the outside and to avoid the necessity of getting inside the box to apply the end bushings, the box and the bushings may be constructed after the manner illustrated in Figs. 3 to 7, where the knockout 27 is of a form to leave four equally spaced wide notches 28 and between those, four equally spaced narrow notches 29 in the edge of the knockout opening, respectively, to admit (Fig. 5) and to then hold back (Fig. 6), correspondingly positioned ribs or lugs 30 on the bushing 31.

In practise, after putting the lock nut 32 in place and backing it away from the end of the conduit 33, the bushing 31 is applied and turned up tight. Then, with the knockout 27 removed, the conduit can be passed through the side of the box, as in Fig. 5, with lugs 30 on the bushing entering through the wide notches 28. Then, upon rotating the conduit one-eighth of a turn one way or another and pulling it back, the lugs 30 will engage in and be caught by the smaller notches 29. With the bushing and pipe then held against rotation, the lock nut 32 can be turned up tight against the outer face of the box wall to securely fasten the parts together.

In some instances the inclination of the box side walls is no disadvantage, or in fact, may be desired for connecting the conduit or cable. In other cases though and possibly for usual purposes, it may be required that the pipe or cable be connected at right angles to the back of the box. To enable change from the inclined to a rectangular relation, circular portions of the box wall surrounding the knockouts are rendered bendable by the provision of generally semi-circular arcuate slots 34 at opposite sides of a center line 35 parallel with the back wall and representing an axis about which the arcuate portions 36 above and below the knockout can be bent, as in Figs. 3 and 4, into a plane substantially at right angles to the back wall.

This bending of the knockout portions of the box wall may be accomplished by using a short length of pipe as a bending tool, after setting it up as in Fig. 4, but it may be preferred to use a special bending tool made for the purpose and shown in Figs. 11 and 12 as comprising a tubular handle 37 having rectangularly disposed end bending faces 38, 39 diametrically opposite and spaced longitudinally approximately the thickness of the box wall so as to engage respectively the outer and inner faces of the arcuate bendable portions 36, 36. The opposed bending faces 38, 39 may be provided by simple lug extensions on the opposite sides of the handle and of sufficient lateral extent only to take a firm grip on the bendable wall portions so that, as will be clear from Fig. 10, the tool may be readily entered in the knockout opening by a simple hooking movement.

Figs. 8 to 15 illustrate a modified form of knockout in which the narrow notches 29 first shown are omitted and the inserted bushing and pipe held against turning while the lock nut is being tightened by a small lug 40 struck inward at the edge of the knockout opening.

Figs. 13 and 14 in particular show how the inwardly struck lug 40 will be engaged by and will hold one of the lugs 30 on the bushing, after the same have been passed in through the notches 28 in the knockout opening.

The inwardly angled lugs 40 are shown located at the innermost portions of the knockout openings; that is, nearest the back wall 17 of the box so as to stand out of the way of an inserted box body and hence not interfere with the nesting engagement of the boxes, one within the other, as indicated in Fig. 15.

The bending tool is constructed so as not to interfere with the inwardly extending holding lugs 40. In the illustration, the bending lug 39 which enters inside the box, is shown as forked or notched at 41 to pass freely over lugs 40, as indicated in Figs. 10, 11 and 12. The holding or stop lugs 40 may be struck inward by the dies which form the knockouts or be cut and struck inward in a separate operation.

In view of the broad scope of the invention, the terms employed herein are to be considered as used in a descriptive, rather than in a limiting sense, except as intended limitation be clearly apparent or possibly be required by the state of the prior art.

The concrete box illustrated in Figs. 16, 17 and 18 embodies features previously described and certain additional novel features.

In particular, the side wall of this box is made from a blank 42, Fig. 16, in the nature of an arcuately curved strip having convergent fold lines 43 for producing, in this case, the eight tapered sides of the conical or truncated box form shown in Fig. 18.

The back wall of the box consists of an octagonal shaped plate 44, resting on paired lugs 45 inturned at the back edge of the side wall and held so located by overturned single lugs 46. The corresponding parts for forming these lugs are similarly numbered in Fig. 16, being provided on the upper or shorter edge of the blank by the V-shaped notches 47 at the fold lines of the side panels 48 and the pairs of notches 49 in the intermediate portions of the panels between the V notches.

The lug portions 45 are folded inward on the lines 50 and the V-shaped notches 47 provide clearance between the inturned lugs of adjoining panels, enabling said lugs to substantially abut, as indicated at 51 in Figs. 17 and 18, thus to provide a maximum of strength for supporting the top and the load imposed thereon by a chandelier or other electric fitting suspended from the top.

In particular, this strongly supported back wall is important for hanging fluorescent light fixtures carrying heavy induction or ballast coils and the like. In such installations, the conduit entering the sides of the box, anchors and supports the box wall in the concrete and the abutting inturned ulgs 45 transfer the load imposed on the back wall to the side wall thus fully supported in the concrete.

In the deep form of concrete box shown, two or more knockouts may be provided in each panel of the side wall, as indicated on one of the panels in Fig. 16.

The importance of being able to enter and secure the conduit end wholly from the outside is particularly apparent in this deep form of box, especially for those knockouts located nearest the back wall, that is, in the deepest part of the box.

Two of the side wall panels are shown in Fig. 16 as having nailing lug extensions 52 which can be bent out, as in Figs. 17 and 18, for nailing the box down on the wooden concrete form. If desired, though, or in addition to these extended lugs, some of the panels may have inverted U-shaped cuts 53 near the lower edges, providing semi-detached portions 54 which can be bent outward or inward to serve as nailing lugs.

The remaining views illustrate forms of the invention eliminating need for any lock nuts on the pipe at the outside of the box. This is accomplished by providing a flange on the bushing, which will engage the outer face of the box wall in opposition to pressure applied by the bushing against the inner face of the wall.

In Figs. 19, 20, 21, the bushing 30 has a flange 55 at the inner end of the same, spaced inward from the inner ends of the lugs 30, of bushing 31, a distance substantially equal to the thickness of the box wall 18, and said inner ends of the lugs or ribs are inclined as at 56, Fig. 21, to act as wedges engaging the inner face, in opposition to said flange engaging the outer surface. After being entered through the notches 28, the inclined ends 56, of the ribs, on rotation of the pipe and bushing, will wedge over the inner face of the wall sufficiently to lock the bushing in place. In this particular example, the flange is indicated as cut away at 57, directly opposite the wedge-shaped ends of the ribs, permitting a slight displacement or tensioning of the box wall as the bushing is rotated to locked position.

In Figs. 22, 23, 24, the top or peripheral portion of the rib 30, on the bushing, performs a wedging function by engaging against an eccentric contacting edge portion 58, of the knockout opening, after entry of the rib through the notch 59, provided for the purpose. When so entered, the grooved peripheral portion 60, of the bushing diametrically opposite the rib will rotatably engage over the edge of the knockout opening, substantially as indicated in Figs. 22 and 23.

The peripheral portion of the wedging rib may be slightly grooved as indicated at 61, Fig. 22, to interlock over the edge of the eccentric contracting portion of the box wall as the bushing is rotated to firmly seated position.

In this form of the invention, the bushing, if desired, may be locked in the wedged condition as by means of a set screw 62, extendig through a lug or the end flange portion of the bushing at 63, to clamp against the face of the box wall.

The embodiments of the invention illustrated in Figs. 25 to 29, are similar to those last considered, in that the bushing 31, has a flange 55, at the inner end of the same, to engage the outer face of the box wall and radially projecting longitudinally extending rib or ribs 30, to enter through notches 28, in the edge of the knockout opening and engage the inner face of the wall.

The locking of the bushing in the fully seated relation however, is accomplished by driving a nail, screw or other fastening through notches or recesses in the bushing and box wall, which register only when the bushing is inserted and turned to its fully seated position, with one rib of the bushing against the stop lug 40, on the box wall, Fig. 28.

In the illustration, the notches 28, provided in the box wall for entry of the ribs, are utilized for this secondary or additional purpose, these coacting with grooves 64, in the bushing at the sides of the ribs 30, to provide openings which will receive a fastening such as a nail or stud 65, Fig. 27, or a screw 66, Fig. 29. The ends of the grooves inside the box may be closed off or curved radially outwardly as indicated at 67, to deflect and bend or tension the fastening, so that it will be held locked in place.

If nails or studs are used as in Fig. 27, these preferably would be of a tapered rounded end formation and possibly notched or roughened, so as to gain a positive or frictional interlock with the box wall and bushing.

If screws are used as in Fig. 29, these preferably would be of tapered construction and hardened or hard enough to bite or take a firm grip against the corner edges of the box wall and opposing surface of the groove in the bushing.

Since no lock nuts are required with the bushings in the latter forms of the invention, the pipe used need be threaded only a few turns, usually only about 2½ or 3 threads and after threading, the bushing may be screwed tightly in place on the pipe, while it is still held in the vise for the cutting of these few threads. The bushings, inserted as they are from the outside, may project only a slight distance into the interior, thus leaving more room within the box for wiring purposes.

In the several forms of the invention illustrated, the ribs or projections are shown provided on the bushings and the knockout openings are shown as notched to correspond. A reversal of this arrangement may be employed however, in which case, the edges of the knockout openings would have ribs or projections extending radially inwardly of such openings and the bushings would have corresponding notches or grooves to receive such projections in the act of passing the bushings through the box wall.

What is claimed is:

1. An outlet box, switch box or the like, comprising a box body of bendable material, said box body having a knockout in the wall of the same and complementary slots defining partly detached portions at opposite sides of said knockout and rendering said partly detached portions bendable about an axis intersecting the knockout, between said slots into a plane inclined relative to the general plane of said box wall.

2. An outlet box, switch box or the like, comprising a box body having a conduit receiving opening in the wall of the same and complementary partly detached portions at opposite sides of said opening bendable about an axis intersecting the opening between said partly detached portions into a plane inclined relative to the general plane of said box wall, said conduit receiving opening having notches in the edge of the same and a conduit of a size to enter said opening and having lugs to pass through said notches and engage over the inner face of said partly detached portions of the wall for effecting the bending of the same as described.

3. An outlet box, switch box or the like, comprising a box body having an inclined side wall provided with a conduit receiving opening, said side wall having weakened portions at opposite sides of said opening bendable into a plane at an angle to said inclined side wall and a tubular member insertible through said opening and having shoulders engageable with the inner and outer faces of said bendable portions at opposite sides of the opening and enabling said tubular member to be used as a lever for effecting the bending of said portions into desired angular relation to said side wall.

4. An outlet box, switch box or the like, comprising a box body having a conduit opening provided with a notch in the edge of the same, a member insertible through said opening, a bushing engaged on said member and insertible through the opening in position on said member, said bushing having a lug of a size to pass through said notch and to engage the inner face of said wall upon relative rotation of the bushing after insertion through said opening and a lock nut on said member at the outside of the box wall for drawing said member outward with said lug firmly engaged against the inner face of the box wall, said box wall having a smaller notch at one side of said notch of less dimensions than said lug and arranged to partly receive said lug for retaining the bushing against rotation.

5. An outlet box, switch box or the like, comprising a box body having an opening of a size to pass a conduit bushing and a notch in the edge of said opening, a conduit bushing for passage through said opening and having a lug to pass through said notch and engage behind the box wall upon relative rotation of the bushing after passage through the wall, said box wall having complementary oppositely disposed substantially arcuate slots therein, weakening portions of the wall at opposite sides of said opening.

6. An outlet box, switch box or the like, comprising a box body having an opening of a size to pass a conduit bushing and a notch in the edge of said opening, a conduit bushing for passage through said opening and having a lug to pass through said notch and engage behind the box wall upon relative rotation of the bushing after passage through the wall, said box wall having complementary oppositely disposed substantially arcuate slots therein, weakening portions of the wall at opposite sides of said opening, a conduit over the end of which said bushing is engaged, the lug on said bushing engaging the weakened portion of the box wall at the inner face of the same and a lock nut on said conduit engaging the weakened portion of said box wall at the outer face of the same.

7. In combination, an outlet box having a side wall inclined to the back wall and with a knockout opening therein, said side wall being weakened above and below said knockout opening rendering said knockout opening portion of the side wall bendable into a plane at right angles to the back wall and a piece of pipe extending through said knockout opening and having shoulders engaging inner and outer faces of said weakened bendable portion of said box wall.

8. An outlet, switch box or the like, having an opening for a conduit bushing, said opening having notches in the edge of the same, a conduit bushing of a size to enter said opening from the outside of the box and having ribs to enter said notches and pass over the inner face of the box wall upon rotation of the same in said opening, said bushing having a flange engageable with the outer face of the box wall, means for locking said bushing in said relatively rotated position thus engaged in said opening, including a fastening driven from the outside of the box through one of the notches in said opening, said bushing having a recess opposed to said notch in said relatively rotated position of the bushing.

EDWARD A. LEFEBRE.

REFERENCES CITED

The following references are of record in the file of this patent:

UNITED STATES PATENTS

| Number | Name | Date |
|---|---|---|
| 1,667,814 | Morgenstern et al. | May 1, 1928 |
| 1,802,979 | Madden et al. | Apr. 28, 1931 |
| 811,772 | Gleason | Feb. 6, 1906 |
| 946,646 | Pratt | Jan. 18, 1910 |
| 2,321,640 | Adkins | June 15, 1943 |
| 978,504 | Stewart | Dec. 13, 1910 |
| 650,184 | Maddock | May 22, 1900 |
| 982,535 | Rudkiewicz | Jan. 24, 1911 |
| 1,527,831 | Borgner | Feb. 24, 1925 |
| 1,893,132 | Croslen | June 3, 1933 |